March 18, 1924.
J. HAMPSON
1,487,459
SPRING SUSPENSION FOR PERAMBULATORS AND OTHER VEHICLES
Filed April 4, 1922    2 Sheets-Sheet 1
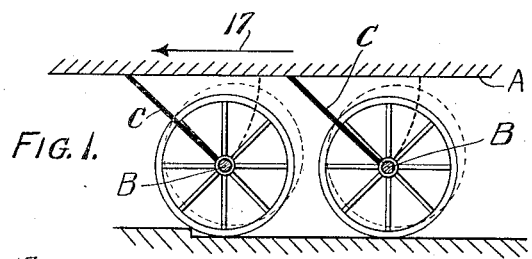
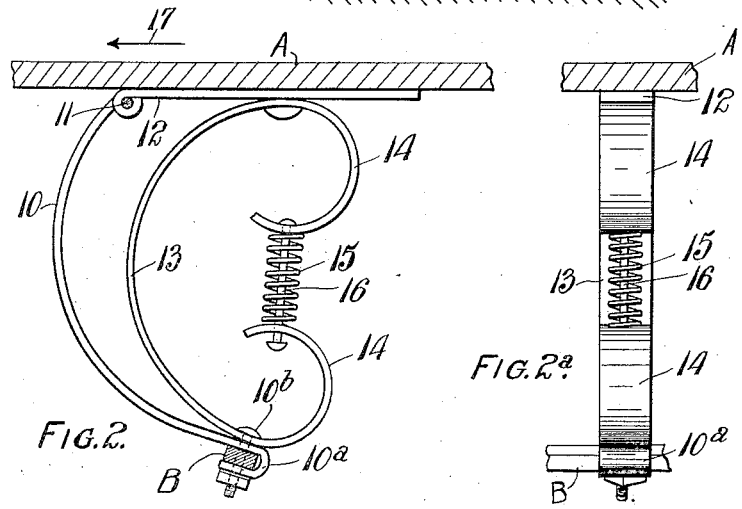
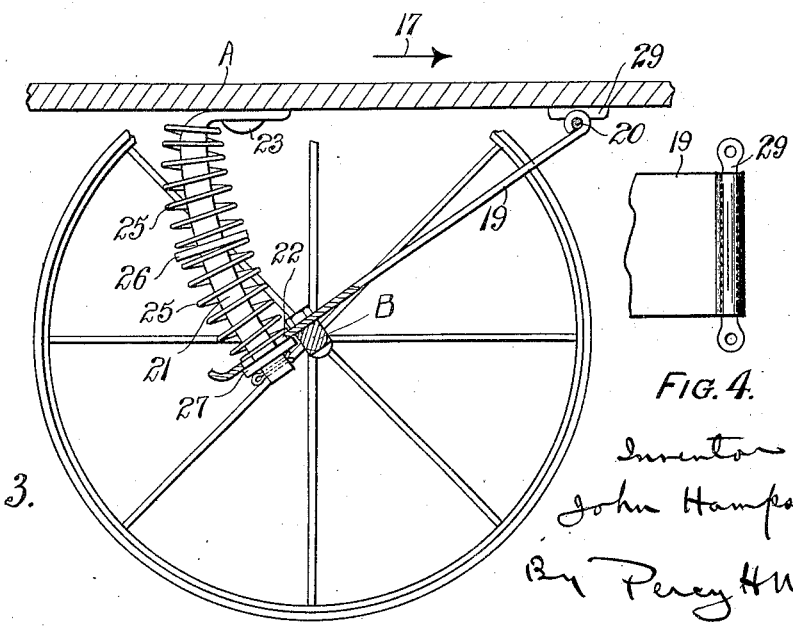

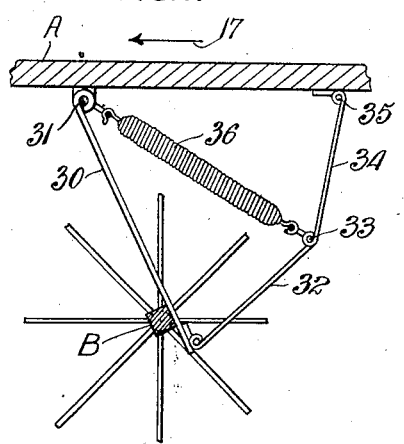
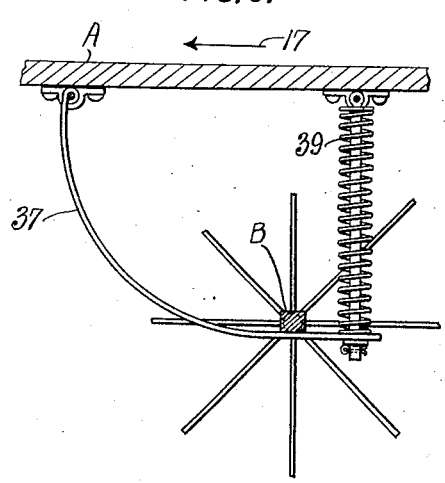
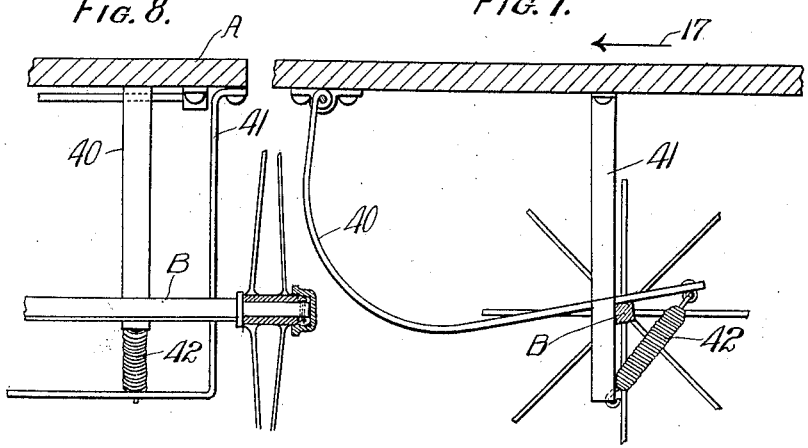
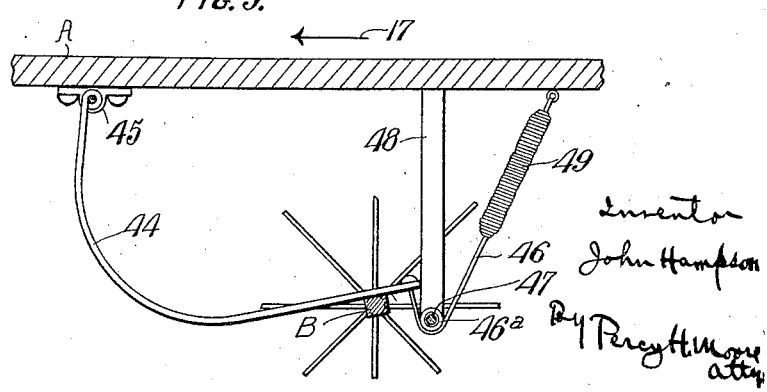

Patented Mar. 18, 1924.

1,487,459

UNITED STATES PATENT OFFICE.

JOHN HAMPSON, OF LONDON, ENGLAND.

SPRING SUSPENSION FOR PERAMBULATORS AND OTHER VEHICLES.

Application filed April 4, 1922. Serial No. 549,532.

*To all whom it may concern:*

Be it known that I, JOHN HAMPSON, a subject of the King of Great Britain, residing at London, England, have invented certain new and useful Improvements Relating to Spring Suspensions for Perambulators and Other Vehicles, of which the following is a specification.

This invention relates to improvements in the suspension of wheels on perambulators, baby carriages and other wheeled vehicles and has for its object a simple and effective construction enabling such vehicles or carriages to be more easily wheeled up steps or stairs or propelled or drawn over uneven ground without causing the body of the carriage to be unnecessarily shaken or jolted.

According to the principal feature of the invention, the front and rear wheels are mounted on axles which are carried by arms, brackets, rods or the like pivoted or hinged to the body of the vehicle, the point of connection of said arms to the vehicle body being located in front of and preferably above the axes of the wheels.

Suitable spring means are employed, arranged in any suitable manner to afford a resilient support for the wheels and to absorb shocks.

The invention is also applicable to the mounting of seats, saddles or the like in connection with the body of a wheeled vehicle for preventing undue shocks being transmitted from the wheel axle or axles to the body of the rider or occupant of the seat.

The invention may be applied to wheeled vehicles of other types which may be manually propelled, horse drawn or mechanically driven.

In one construction according to the invention as applied to a baby carriage, the axles are each mounted at or near one end of a pair of curved arms the opposite ends of which are pivotally connected to a pair of brackets or lugs fixed to the under face of the vehicle body and located in front of a vertical transverse plane passing through the corresponding wheel axle. Extending downwardly from the body of the vehicle adjacent the axles are brackets or arms, the ends of which extend below the axles, and coiled or other springs are interposed between the lower end of this bracket and the ends of the curved arms carrying the axles. By this means when the wheels come into contact with a step such for instance as a curb stone the wheel axle of the front pair of wheels is deflected upwardly through an arc, the centre of which corresponds to the axis of the pivotal connection of the curved arms to the vehicle body so that the path of movement of the axles and consequently of the wheels corresponds as nearly as possible to the contour of the step or curb stone, the wheels being thereby caused to roll over the obstruction with very little jolting or vibration being transmitted to the body of the vehicle.

In a modified construction, instead of the springs being connected to the lower ends of the brackets fixed to and depending from the vehicle body, I may provide each bracket with one or a pair of rollers or pulleys over which pass cords, straps or other flexible members. One end of each of the flexible members is connected to one of the curved arms carrying the wheels, whilst the opposite end is attached to a spring connected at its opposite end to the vehicle body. In this construction the movement of the wheel axle about the pivotal connection at the upper forward ends of the curved arms is taken up by the spring in a similar manner to the construction previously described.

In a still further modified construction, the vehicle body has fixed, pivoted or hinged thereto a pair of depending curved rods which have a sliding engagement with holes or slots in the neighbourhood of the rear ends of the curved arms carrying the axle.

These curved rods are encased in one or more spiral springs which normally maintain said axle in its lowermost position furthest away from the body of the vehicle.

In this construction each of the rods may have two sets of springs, one within the other, the outer springs being of greater strength and coming into operation when the vehicle is under a heavy load.

In a further form of the invention I construct the resilient device as a link motion, two of the links being constituted by the under carriage or its equivalent and the pivoted arm connected to the wheel axle or corresponding part, whilst the other two links are pivoted together at one of their extremities, and one of them is pivoted at the other end to the undercarriage or equivalent part whilst the other is pivoted at the other end to the arm carrying the wheel axle or the like. A helical tension spring or its equivalent is also provided connecting the angle of the link motion at the pivotal connection between the under carriage or the like and the arm, and the angle of the said link motion formed by the other two links, and means may be provided for varying the tension of the spring.

In order that the invention may be readily understood reference is made to the accompanying drawings, in which I have illustrated several constructions according to the invention applied to a perambulator or baby carriage.

Fig. 1 is a diagrammatic view illustrating the principle of the invention applied to a perambulator.

Fig. 2 is a side elevation showing one construction of the supporting means for the wheel axle.

Fig. 2a is an edge view of Fig. 2.

Fig. 3 is a similar view of a modified construction, and Fig. 4 is a detail of the construction shown in Fig. 3.

Figs. 5 and 6 are side elevations of a further modified construction.

Fig. 7 shows a still further modified form and Fig. 8 is a side view of Fig. 7.

Fig. 9 shows in side elevation a further modified construction.

In Figs. 2 to 9 of the drawings, I have illustrated one only of the wheel axles and whilst I prefer to support the same from the body of the vehicle by a pair of supporting members, one only may be used if so desired.

Referring to Fig. 1 which illustrates diagrammatically the improved method of suspension for the wheels or wheel axles, the body of the perambulator is indicated at A and the wheel axles at B whilst the supporting members for the wheel axles are indicated at C. Each of the axles is preferably supported by or connected to the body of the perambulator by a pair of supporting members arranged side by side and spaced apart in any suitable manner and if the construction of the supporting members so permits, they may be rigidly connected together by connecting strips or cross braces as will be readily understood.

The supporting members C are connected at their upper forward ends to the underside of the body A of the perambulator and the point of connection of such members to said body is located in front of and preferably above the horizontal axis of the axle B. By this means when the wheels come into contact with an obstruction whilst travelling along a road or other surface, the wheel axles and the wheels mounted thereon move upwardly through a curved path with respect to the body, and in order to absorb any shocks when the wheels meet obstructions in the path of the vehicle, spring means are provided which normally tend to press the free ends of the supporting members away from the body of the vehicle. Thus for instance, when the wheels on the front axle of the vehicle come into contact with a curb stone as shown diagrammatically in Fig. 1, the wheels move towards the position indicated by dotted lines against the pressure exerted by the spring means employed, and the path through which the wheels move coincides or approximately coincides with the vertical surface of the curb stone and thus materially facilitate the passage of the wheels in mounting the curb. The same action is produced when the rear wheels come into contact with the curb stone or other obstruction, and by the construction described the mounting of curbs in thoroughfares is greatly facilitated whilst practically eliminating the jolting usually associated with such vehicles as at present constructed.

I will now refer to the constructional forms of the invention illustrated in Figs. 2 to 9, of the drawings.

In Fig. 2 the wheel axle B is mounted upon a supporting member or pair of supporting members each comprising a curved strip 10 of springy steel which may be of the type usually employed in connection with the spring supporting members of perambulators and the like, and the upper end of this curved strip is pivotally connected at 11 to a suitable strip 12 secured to the undersurface of the body A of the perambulator. The opposite free end of the curved strip 10 is bent upon itself at 10a to embrace the axle B on which the wheels are mounted. The wheel axle is secured to the strip 10 by a bolt 10b which passes both through the axle and through the bent portion of the strip 10 which embraces the axle. Located between the curved strip 10 and the body of the wheel is a C spring 13, preferably shaped as shown in the drawings, and this spring is connected at or near its highest point to the strip 12 and to the underside of the body A and in the neighbourhood of its lower end to the rear end of the curved strip 10 in the neighbourhood of the point of connection of the wheel axle B thereto. The free ends of the C spring 13 are extended inwardly and forwardly and I prefer to provide between the curved ends 14 thereof, a coil spring 15, through which passes a rod 16, adapted to hold the coil spring in position. Or alternatively the ends of the coil spring may be connected by clips or other appropriate means to the respective ends of the C spring so as to retain the same in position.

It is to be understood that the point of connection of the supporting members for the wheel axles is in all cases located in front of the vertical plane of the wheel axle, and in the constructions illustrated, this point of connection is also located above the axle. The direction of movement of the vehicle is therefore indicated in the drawings by the arrow 17. It will thus be seen that when the wheel 18 on the axle B in the construction shown in Fig. 2 of the drawings comes into contact with an obstruction, the wheel axle B moves both rearwardly and upwardly, the C spring 13 being compressed and its lower end moving about the point of connection of the C spring to the vehicle body, whilst the curved springy strip 10 is also able to move about its hinged connection at 11 to the vehicle body. By this construction an extremely resilient suspension for the wheel axle is obtained, the jolting or shocks due to the wheels meeting obstructions or coming into contact with curb stones being taken up on the one hand by the natural springiness of the material from which the curved strip 10 and the C spring 13 are made and on the other hand by the buffer spring 15 between the coiled ends of said C spring.

Fig. 3 shows a construction in which the axles B carrying the wheels are fixed in the neighbourhood of the ends of a straight rod 19 made of strip metal which is hinged to the body A at 20, its free end having a sliding engagement with a stationary guide piece 21, fixed to the body A. The end of the strip or arm 19 is provided with a perforation or elongated slot 22 which embraces a tubular guide 21, formed of metal tube and curved about the point 20 as the centre. The upper end of the guide is flattened and bent laterally to form an extension to enable the same to be secured to the underside of the body A by screws, rivets or bolts 23. Surrounding the tubular guide are buffer springs 25, 25 between which is inserted a washer 26, and the guide carries at its lower end a washer 27 of rubber, fibre or other suitable material with which the underface of the arm 19 comes into contact to prevent clatter and eliminate noise as far as possible, the washer being held in position and the movement of the arm 19 being limited by a pin 28 inserted through said guide. The upper forward end of the supporting member 19 in this construction is connected to a lug 29 fixed to the underside of the body A.

In the construction shown in Fig. 5, the axle B is fixed to the lower end of the supporting arm 30, the upper end of which is pivotally connected at 31, to the body A. Pivoted to the said arm at or near the point to which the axle B is connected is a relatively shorter link 32, as compared with the before mentioned arm which link is again pivotally connected at 33 to a second link 34, the opposite end of which is pivotally connected or hinged to the body A at 35, the links 32 and 34 being of approximately equal length. The spring means employed in this construction consist of a spiral or coil spring 36, connected at one end to the arm 30 or to the body A adjacent the pivotal connection of said arm to said body and at the opposite end to one or other of the links 32 or 34 adjacent the point of pivotal connection between them. The tendency of the spring is to cause the links 32 and 34 to move into alignment with one another and any shocks transmitted from the wheels through the arm 30 are taken up by this spring. In this construction I may if desired provide adjusting means for increasing or decreasing the tension of the spring 36 said means comprising for instance a screwed rod attached to the spring and passing through one of the links 32 or 34 and being provided with a nut so that the rod or screw can be adjusted as desired. In this way a very supple and resilient support is obtained which can be easily adjusted according to the load on the body A.

Fig. 6 shows a construction somewhat similar to that shown in Fig. 4, but in this case the supporting arm 37 is movably connected to a pivotal guide consisting of a rod 38 hinged at its upper end to the body A and having a sliding engagement with the arm 37 at or towards its lower end, the resiliency being obtained by a coil spring 39 surrounding said rod.

In the construction shown in Figs. 7 and 8 the supporting arm 40 is curved and may be formed of springy steel and the axle B is attached thereto at or towards its free end. The axle B may be mounted so as to form a stop for limiting the downward movement of the end of the arm 40 which contacts with a U shaped frame member 41, fixed to the under side of the carriage A. The resiliency in this construction is obtained by a spring 42 attached at one end to the end of the arm 40 and at the opposite end to the cross member of the U shaped frame 41.

In the construction illustrated in Fig. 9, the curved supporting member 44 which is pivotally connected to the body A at 45, has attached to the end thereof a flexible cord, cable or the like 46, which passes over a roller or pulley wheel 46ª carried by a supporting rod 47 mounted in brackets 48. The opposite end of the flexible cord is attached to one end of a coil spring 49 the opposite end of which is connected to the body A. The axle in this construction is mounted on the arm 44 a short distance from its free end.

It will be understood that although I have illustrated in the drawings only one of the supporting arms, that it is preferable to provide two such arms spaced apart so that the axle B is supported equally in the neighbourhood of both its ends. In the constructions shown in Figs. 3 and 4 the two arms supporting each axle may be connected together by cross strips so as to form a pivotal supporting frame to which the axle B is attached.

It will be understood that the details of construction may be modified in many ways without departing from the principle of the invention. The arms on which the wheel axles are mounted need not necessarily be curved and instead of being pivotally connected to lugs or brackets they may be mounted on a transverse rod or spindle attached to the under surface or end of the body of the vehicle. The wheels may be mounted separately on a stub axle and each stud or spindle may be supported by a separate spring controlled pivotal arm.

The means for suspension above described enable a perambulator or other vehicle to mount an obstacle with comparative ease without unnecessary vibration or jolting of the body of the vehicle, to the discomfort of the occupant, and the construction has the advantage that the vehicle can be easily wheeled up and down stairs without the customary violent jolting at each step as is usually the case with baby carriages as at present constructed.

Means may also be provided for adjusting the tension of the springs.

In some cases in place of carrying the axle by means of an arm or the like, hinged or pivoted to the under carriage, I may carry the axle by means of a leaf laminated or other spring arm, suitably attached thereto.

What I claim and desire to secure by Letters Patent in the United States of America:—

1. Suspension means for the wheels of baby carriages and other wheeled vehicles comprising pairs of rigid arms each arm being pivoted at one end to the body of the vehicle and projecting rearwardly and downwardly, wheel axles connected to each pair of arms at the ends remote from the pivots and flat strip C springs, between the axles and portions of the body in substantially the same horizontal plane as the pivotal connection of the arms with the body, for the purposes set forth.

2. Suspension means for the wheels of baby carriages and other wheeled vehicles comprising pairs of rigid arms each arm being pivoted at one end to the body of the vehicle and projecting rearwardly and downwardly, wheel axles connected to each pair of arms at the ends remote from the pivots, flat strip C springs between the axles and body, said springs having additional buffering springs between the free ends of each C spring, between the axles and portions of the body in substantially the same horizontal plane as the pivotal connection of the arms with the body for the purposes set forth.

In witness whereof I affix my signature.

JOHN HAMPSON.